US012705873B2

(12) United States Patent
Cheng et al.

(10) Patent No.: US 12,705,873 B2
(45) Date of Patent: Aug. 11, 2026

(54) SYSTEM INTEGRATED MACHINE-LEARNING CO-PROCESSING

(71) Applicant: Microsoft Technology Licensing, LLC, Redmond, WA (US)

(72) Inventors: Yow-Wei Cheng, Taipei (TW); Yung Jen Chen, TaoYuan (TW); Sheng-Han Tsai, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 258 days.

(21) Appl. No.: 18/442,364

(22) Filed: Feb. 15, 2024

(65) Prior Publication Data

US 2025/0265830 A1 Aug. 21, 2025

(51) Int. Cl.

| | |
|---|---|
| ***G06V 10/82*** | (2022.01) |
| ***G06V 10/26*** | (2022.01) |
| ***G06V 40/16*** | (2022.01) |
| ***H04N 23/11*** | (2023.01) |
| ***H04N 23/13*** | (2023.01) |

(52) U.S. Cl.

CPC .............. *G06V 10/82* (2022.01); *G06V 10/26* (2022.01); *G06V 40/166* (2022.01); *H04N 23/11* (2023.01); *H04N 23/13* (2023.01)

(58) Field of Classification Search

CPC . G06T 2207/10024; G06T 2207/10048; G06T 2207/20081; G06T 2207/20084; G06T 2207/30201; G06T 7/11; G06V 10/26; G06V 10/82; G06V 40/166; H04N 1/32352; H04N 23/11; H04N 23/13

USPC .......................................................... 348/164

See application file for complete search history.

(56) References Cited

U.S. PATENT DOCUMENTS

2021/0357691 A1* 11/2021 Luo ...................... G06V 10/143
2022/0101047 A1* 3/2022 Puri .......................... G06T 5/70
2023/0061517 A1* 3/2023 Yang .................... G06V 10/774

(Continued)

FOREIGN PATENT DOCUMENTS

WO WO-2022241307 A1 * 11/2022 ............. G06T 1/005

OTHER PUBLICATIONS

"Always-On Camera Use Case Flow", Feb. 17, 2023, 1 Page.

(Continued)

*Primary Examiner* — Kathleen M Walsh

(74) *Attorney, Agent, or Firm* — Shook Hardy & Bacon L.L.P.

(57) ABSTRACT

The technology described adds a ML inference to the output of an image signal processor (ISP) associated with a camera. The combined image and ML inference may be described herein as an augmented image. Once generated, the augmented image may be communicated to other components of a computing system associated with the camera and/or ISP. The initial inference may be generated by a neural processing unit (NPU) associated with the ISP. The ISP may communicate a generated image to the NPU prior to communicating the image to a computing system. In an aspect, the NPU inference is combined with the image using image steganography. Once communicated from the camera to the computing device, the augmented image may be separated into a base image and inference by a camera driver or other component associated with the image management.

20 Claims, 7 Drawing Sheets

(56) References Cited

U.S. PATENT DOCUMENTS

2024/0054773 A1* 2/2024 Mansata ................ G06V 10/26
2024/0412491 A1* 12/2024 Sah ........................ G06N 3/045

OTHER PUBLICATIONS

"Exif", Retrieved From: https://en.wikipedia.org/wiki/Exif, retrieved on Mar. 4, 2024, 13 pages.
"Steganography", Retrieved From: https://en.wikipedia.org/wiki/Steganography, retrieved on Mar. 4, 2024, 18 pages.
"Calibration Tools API", accessed on URL: https://www.intel.com/content/www/us/en/download/645988/29618/intel-realsense-d400-series-dynamic-calibration-tool.html, Mar. 27, 2023, 2 pages.
"Camera Calibration and 3D Reconstruction", accessed on URL: https://docs.opencv.org/2.4/modules/calib3d/doc/camera_calibration_and_3d_reconstruction.html, 48 pages.
"Intel RealSense D400 Series Product Family Datasheet", accessed on URL: https://dev.intelrealsense.com/docs/intel-realsense-d400-series-product-family-datasheet, 2024, 2 pages.
"Multicamera stitching with ROS", accessed on URL: https://www.intelrealsense.com/how-to-multiple-camera-setup-with-ros/, Jan. 10, 2019, 11 pages.
"Projection in RealSense SDK 2.0", accessed on URL: https://github.com/IntelRealSense/librealsense/wiki/Projection-in-RealSense-SDK-2.0, Aug. 3, 2018, 8 pages.
Dorodnicov, et al., "Projection, Texture-Mapping and Occlusion with Intel® RealSense™ Depth Cameras", Retrieved From: https://dev.intelrealsense.com/docs/projection-texture-mapping-and-occlusion-with-intel-realsense-depth-cameras, 2024, 11 Pages.
Hussain, et al., "Image steganography in spatial domain: a survey" Signal Processing: Image Communication, Mar. 28, 2018, 21 Pages.
International Search Report and Written Opinion received for PCT Application No. PCT/US2025/010359, Apr. 15, 2025, 14 pages.

* cited by examiner

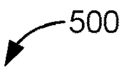

RECEIVE AT AN IMAGE SIGNAL PROCESSOR (ISP) RAW SENSOR DATA FROM A SENSOR THAT IS ASSOCIATED WITH A CAMERA 510

↓

GENERATE AN IMAGE AT THE ISP USING THE RAW SENSOR DATA 520

↓

COMMUNICATE THE IMAGE FROM THE ISP TO A NEURAL PROCESSING UNIT (NPU), WHEREIN THE NPU INCLUDES A MACHINE-LEARNING (ML) MODEL TRAINED TO MAKE AN INFERENCE ABOUT AN INPUT IMAGE 530

↓

GENERATE, AT THE NPU USING THE ML MODEL, A ML INFERENCE ABOUT THE IMAGE 540

↓

ASSOCIATE THE ML INFERENCE WITH THE IMAGE TO FORM AN AUGMENTED IMAGE 550

↓

COMMUNICATE THE AUGMENTED IMAGE FROM THE ISP TO A COMPUTING COMPONENT 560

FIG. 5

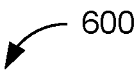

RECEIVE, AT AN IMAGE SIGNAL PROCESSOR (ISP), RAW COLOR SENSOR DATA FROM A COLOR SENSOR THAT IS ASSOCIATED WITH A FIRST TYPE OF CAMERA 610

RECEIVE, AT THE IMAGE SIGNAL PROCESSOR (ISP), RAW SECOND SENSOR DATA FROM A SECOND SENSOR THAT IS ASSOCIATED WITH A SECOND TYPE OF CAMERA, WHEREIN THE FIRST TYPE OF CAMERA AND SECOND TYPE OF CAMERA ARE DIFFERENT 620

GENERATE A COLOR IMAGE AT THE ISP USING THE RAW COLOR SENSOR DATA 630

GENERATE A SECOND IMAGE AT THE ISP USING THE SECOND SENSOR DATA 640

COMMUNICATE THE COLOR IMAGE AND THE SECOND IMAGE FROM THE ISP TO A NEURAL PROCESSING UNIT (NPU), WHEREIN THE NPU INCLUDES A MACHINE-LEARNING (ML) MODEL TRAINED TO MAKE AN INFERENCE ABOUT AN INPUT IMAGE 650

RECEIVE A ML INFERENCE ABOUT THE COLOR IMAGE FROM THE NPU, WHEREIN THE NPU GENERATED THE ML INFERENCE USING THE SECOND IMAGE AS INPUT 660

COMMUNICATE THE ML INFERENCE FROM THE ISP TO A COMPUTING COMPONENT 670

FIG. 6

SYSTEM INTEGRATED MACHINE-LEARNING CO-PROCESSING

CROSS-REFERENCE TO RELATED APPLICATIONS

None.

BACKGROUND

Machine learning (ML) is being used by more and more applications running on a client device and/or by remote service providers. For example, ML based camera special effects, such as background blur, auto framing, eye contact and other special filters, have become more and more popular on video-conference solutions. Those features are being provided from many different services or applications, including software plugins (add-ons) or even built-in hardware. Each of these features may be implemented from start to finish by the different services or applications. In some implementations, different services may redundantly perform the same ML interference. For example, different services may identify an area of an image that depicts a human face as a starting point for subsequent face modifications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described adds a ML inference to the output of an image signal processor (ISP) associated with a camera. The combined image and ML inference may be described herein as an augmented image. The inference may be described as an ISP inference because it is generated by components associated with the ISP. Once generated, the augmented image may be communicated to other components of a computing system associated with the camera and/or ISP. The other components can include applications that use different ML systems to make additional inferences using the both the image and ISP inference from the augmented image as input.

The initial inference may be generated by a neural processing unit (NPU) associated with the ISP. The ISP may communicate a generated image to the NPU prior to communicating the image to a computing system. The neural processing unit may be a single purpose NPU. A single-purpose NPU hosts a single machine-learning model that makes a single inference. The single inference may then be communicated back to the ISP and/or an associated component to generate the augmented image.

Delivering the ISP inference to different applications eliminates the need for the individual applications to make the same inference. The technology enables an ISP inference to be communicated to different applications through a computing system's operating system or other mechanism. In an aspect, the ISP inference is combined with the image using image steganography. Image steganography is the process of including information which can be text, floating numbers, image or video inside a base image. Once communicated from the camera to the computing device, the augmented image may be separated into a base image and inference by a camera driver or other component associated with the image management. A common identifier may allow images and inferences to be associated with each other and communicated together to a ML model taking the image and inference as inputs.

BRIEF DESCRIPTION OF THE DRAWINGS

The technology described herein is illustrated by way of example and not limitation in the accompanying figures in which like reference numerals indicate similar elements and in which:

FIG. 5 is a flow diagram showing a method of generating an augmented image, in accordance with an aspect of the technology described herein;

FIG. 6 is a flow diagram showing a method of generating an augmented image, in accordance with an aspect of the technology described herein.

DETAILED DESCRIPTION

Figure 1:
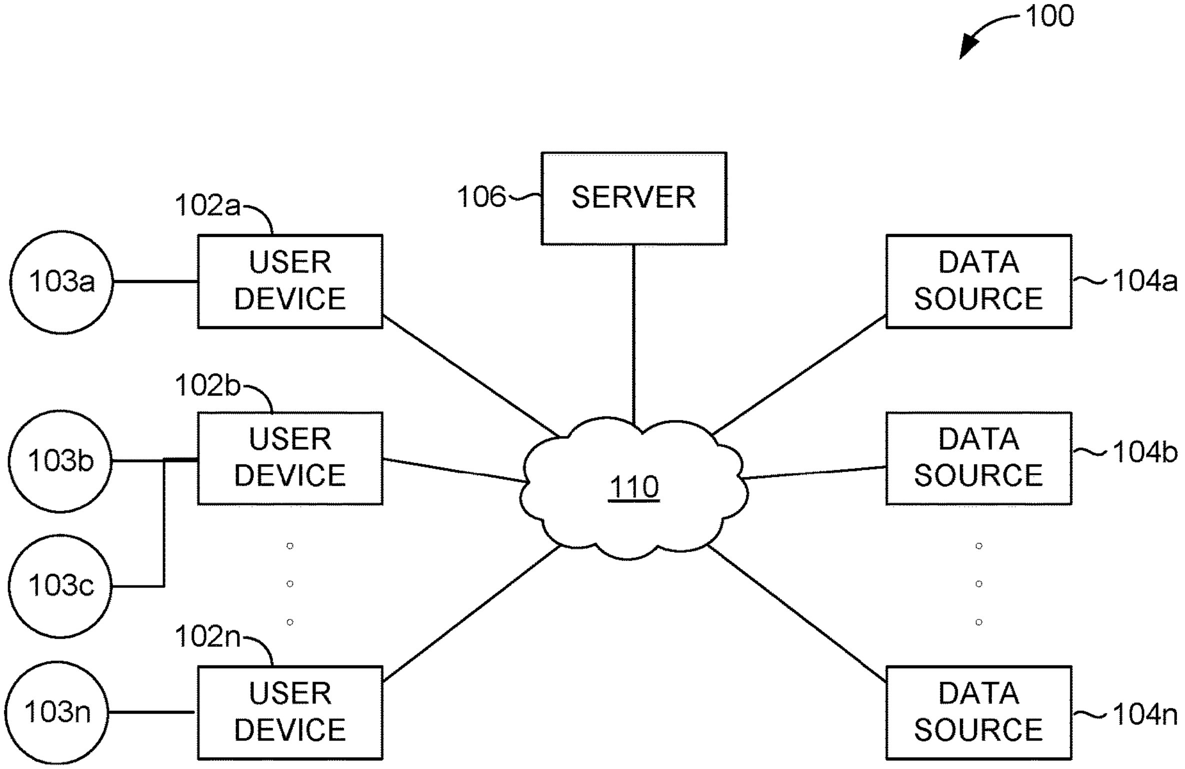
FIG. 1 is a diagram of a computing system suitable for implementations of the technology described herein.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described adds a ML inference to the output of an image signal processor (ISP) associated with a camera. The combined image and ML inference may be described herein as an augmented image. The inference may be described as an ISP inference because it is generated by components associated with the ISP. Once generated, the augmented image may be communicated to other components of a computing system associated with the camera and/or ISP. The other components can include applications that use different ML systems to make additional inferences using the both the image and ISP inference from the augmented image as input.

The initial inference may be generated by a neural processing unit (NPU) associated with the ISP. The ISP may communicate a generated image to the NPU prior to communicating the image to a computing system. The neural processing unit may be a single purpose NPU. A single-purpose NPU hosts a single machine-learning model that makes a single inference. The single inference may then be communicated back to the ISP and/or an associated component to generate the augmented image.

Delivering the ISP inference to different applications eliminates the need for the individual applications to make the same inference. The technology enables an ISP inference to be communicated to different applications through a computing system's operating system or other mechanism. In an aspect, the ISP inference is combined with the image using image steganography. Image steganography is the process of including information which can be text, floating number, image or video inside a base image. The information is hidden in a way that it not visible to the human eyes when the image is displayed on a computing device. For example, a bounding box around where a face is depicted in an image could be identified by an ISP inference and then included in the base image. Traditionally, image steganography has been used to hide information. The technology described herein uses image steganography to communicate the inference in a way that does not require changes to existing methods of communicating images between a camera and a computing device. For example, image steganography may allow the augmented image (which includes the inference) to be communicated according to the Mobile Industry Processor Interface (MIPI) Camera Serial Interface (CSI) specification and/or Universal Serial Bus (USB).

Once communicated from the camera to the computing device, the augmented image may be separated into a base image and inference by a camera driver or other component associated with the image management. A common identifier may allow images and inferences to be associated with each other and communicated together to a ML model taking the image and inference as inputs.

Having briefly described an overview of aspects of the technology described herein, an operating environment in which aspects of the technology described herein may be implemented is described below in order to provide a general context for various aspects.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*b* through 102*n*; a number of data sources, such as data sources 104*a* and 104*b* through 104*n*; server 106; and network 110. Each of the components shown in FIG. 1 is implemented via any type of computing device, such as computing device 700 illustrated in FIG. 7, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 700 in FIG. 7. For instance, server 106 is provided via multiple devices arranged in a distributed environment that collectively provides the functionality described herein. Additionally, other components not shown may also be included within the distributed environment.

User devices 102*a* through 102*n* can be client user devices on the client-side of operating environment 100, while server 106 can be on the server-side of operating environment 100. Server 106 can comprise server-side software designed to work in conjunction with client-side software on user devices 102*a* through 102*n* so as to implement any combination of the features and functionalities discussed in the present disclosure. In one aspect, the server hosts a face editing model that receives the augmented image and uses the augmented image's ML inference as input to the face editing model. This division of operating environment 100 is provided to illustrate one example of a suitable environment, and there is no requirement for each implementation that any combination of server 106 and user devices and 102*a* through 102*n* remain as separate entities.

In some embodiments, user devices 102*a* through 102*n* comprise any type of computing device capable of use by a user. For example, in one embodiment, user devices 102*a* through 102*n* are the type of computing device 700 described in relation to FIG. 7. By way of example and not limitation, a user device is embodied as a personal computer (PC), a laptop computer, a mobile device, a smartphone, a tablet computer, a virtual-reality (VR) or augmented-reality (AR) device or headset, a handheld communication device, an embedded system controller, a consumer electronic device, a workstation, any other suitable computer device, or any combination of these delineated devices.

Each user device 102*a* through 102*n* is associated with one or more cameras. The camera may be external (e.g., a webcam) or integrated, as commonly found in a smartphone, laptop, or tablet. Smartphones today come equipped with a variety of camera types, each serving a unique purpose. The common types of cameras you might find in a smartphone include a wide-angle camera, an ultra-wide-angle camera, a telephoto camera, macro camera, monochrome camera, depth sensor or 3D time-of-flight (ToF) sensor, a front camera (a type of wide-angle camera), and an infrared camera. The wide-angle camera is the most common type of camera found on smartphones. The focal length of the wide-angle camera on smartphones may range between 22 mm and 30 mm. An ultra-wide-angle camera has an even wider angle-of-view than the standard wide-angle lens. The focal length of an ultra-wide-angle phone camera is generally anywhere from about 12 mm to 18 mm. The telephoto camera on a smartphone has a much longer focal length than the wide-angle camera. In most cases, it is two or three times the focal length of the wide-angle camera. The telephoto camera may provide a 2× or 3× "optical zoom" factor. A macro camera allows for extreme close-up photography, usually of very small subjects. A monochrome camera captures images in black and white. It can provide greater detail and depth in the shadows and highlights. A depth sensor or a ToF sensor is used to identify the depth or distance of an object from the camera, helping to create a depth map of the scene. A front camera, also known as the selfie camera, this is usually a wide-angle or ultra-wide-angle camera located on the front of the smartphone. An infrared camera, also known as a thermal imaging camera or thermal camera, is a device that creates an image using infrared (IR) radiation, similar to a normal camera that forms an image using visible light. Instead of the 400-700 nanometre (nm) range of the visible light camera, infrared cameras are sensitive to wavelengths from about 1,000 nm to about 14,000 nm.

External cameras can include webcams that are connected to a user device 102*a* through a USB, Wi-Fi, or other type of connection. However, other types of external cameras may also be used in aspects of the technology described herein. Examples of external digital cameras that may be used include digital single-lens reflex (DSLR) cameras, mirrorless cameras, compact digital cameras, action cameras, 360 degree cameras, and underwater cameras.

DSLR cameras offer a high degree of manual control, interchangeable lenses, and high-quality results. DSLR sensors come in two sizes: full-frame and Advanced Photo System type-C. Mirrorless cameras are similar to DSLRs but do not have a mirror to reflect the image into the viewfinder. This makes them generally smaller and lighter than DSLRs. Compact Digital Cameras are small, easy to use, and generally less expensive than DSLRs and mirrorless cameras. Action Cameras are small, portable cameras designed to capture high-quality video and still images in action scenarios (e.g., skiing, bike riding, sailing). 360 degree cameras can capture images in all directions, creating a spherical image. Underwater cameras are designed to be used underwater, often up to a certain depth. External cameras may connect to the user device through a wireless connection, wired connection, or through a portable memory (Secure Digital (SD) card). In aspects, an augmented image is transferred from the external camera to the user device.

In some embodiments, data sources 104*a* and 104*b* through 104*n* comprise data sources and/or data systems, which are configured to make data available to any of the various constituents of operating environment 100 or system 200 described in connection to FIG. 2. The data sources may remote storage for images. Certain data sources 104*a* and 104*b* through 104*n* are discrete from user devices 102*a* through 102*n* and server 106 or are incorporated and/or integrated into at least one of those components. In one embodiment, one or more of data sources 104*a* and 104*b* through 104*n* comprise one or more sensors, which are integrated into or associated with one or more of the user device(s) 102*a* through 102*n* or server 106. The server 106 could include image editing services, such as provided by social networks or video conferencing services.

Figure 2:
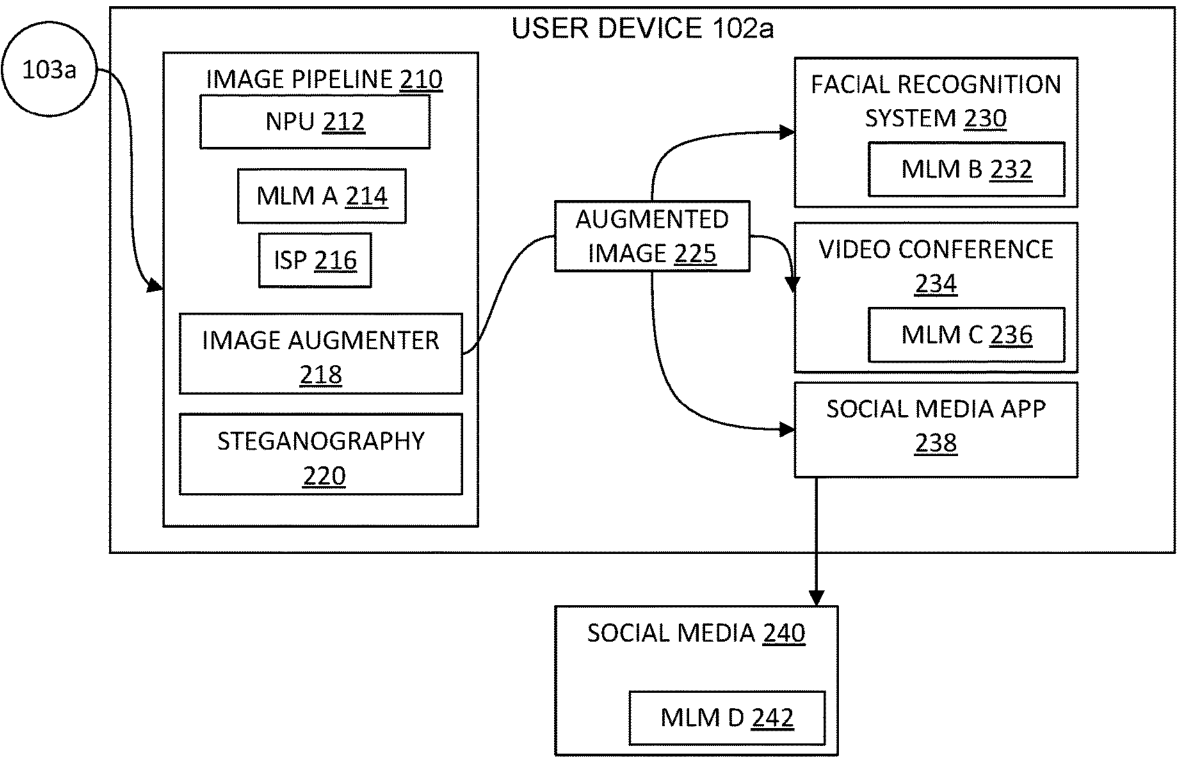
FIG. 2 is a block diagram of an example operating environment for generating an augmented image, in accordance with an aspect of the technology described herein.

Operating environment 100 can be utilized to implement one or more of the components of system 200, as described in FIG. 2. Operating environment 100 can also be utilized for implementing aspects of methods 500 and 600 in FIGS. 5 and 6, respectively.

Referring now to FIG. 2 with FIG. 1, a block diagram is provided showing aspects of an example computing system architecture suitable for implementing some embodiments of the disclosure and designated generally as system 200. FIG. 2 illustrates a camera 103*a* and user device 102*a*. The user device 102*a* includes an image pipeline 210 and several applications that use images and/or augmented images 225 output by the image pipeline 210. The image pipeline 210 includes a neural processing unit 212 with a trained machine-learning model A 214. The image pipeline 210 also includes an image signal processor (ISP) 216. The image pipeline 210 also includes an image augmenter 218 and steganography component 220.

The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. These components may be embodied as a set of compiled computer instructions or functions, program modules, computer software services, or an arrangement of processes carried out on one or more computer systems.

In one embodiment, the functions performed by components of system 200 are associated with training and using a face editing model. These components, functions performed by these components, and/or services carried out by these components may be implemented at appropriate abstraction layer(s) such as the operating system layer, application layer, and/or hardware layer of the computing system(s). Alternatively, or in addition, the functionality of these components, and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components and/or computer systems.

The image signal processor (ISP) 216, also known as an image processing engine, image processing unit (IPU), or image processor, is a type of media processor or specialized digital signal processor (DSP) used for image processing. The ISP takes the raw sensor data generated by a light sensor in a camera and converts the raw sensor data into image data. The ISP can work with different types of sensors, such as the Complementary Metal-Oxide-Semiconductor (CMOS) or charge-coupled device (CCD) sensor. The CMOS image sensor is a type of active-pixel sensor that uses a complementary metal-oxide-semiconductor process to convert light into electrical signals. It consists of an array of photodiodes, each serving as an individual pixel. When light enters the camera through the lens, it strikes the CMOS image sensor, causing each photodiode to accumulate an electrical charge based on the amount of light that strikes it.

The final result (e.g., raw signal) of the CMOS image sensor is digital voltage values that represent the red, green, and blue light intensity seen by each pixel in the pixel matrix of the sensor. These digital voltage values are sent to the ISP 216 and are further processed to generate an image that can be stored and/or displayed. CMOS image sensors are designed with the ability to integrate a number of processing and control functions directly onto the sensor integrated circuit. These features generally include timing logic, exposure control, analog-to-digital conversion, shuttering, white balance, gain adjustment, and initial image processing algorithms. The ISP 216 may generate an image that is communicated to the neural processing unit 212 (NPU).

The neural processing unit 212 (NPU) is a specialized processor designed for accelerating neural network operations and ML tasks. Possible structural components of an NPU include a multiplication and addition module, an activation function module, a 2D data operation module, and a decompression module.

Multiplication and Addition Module: This module is used to calculate matrix multiplication and addition, convolution, dot product, and other functions. In one example, there are 64 Multiply-Accumulate Units (MACs) inside the NPU and 32 in the Small Neural Processing Unit (SNPU), and less in the Micro Neural Processing Unit (MNPU). The technology described herein may use an NPU, SNPU, or a Micro Neural Processing Unit (MNPU). Unless otherwise specified, use of the phrase NPU includes an SNPU and a MNPU.

Activation Function Module: This module is used to implement the activation function in the neural network by using the highest 12th order parameter fitting.

2D Data Operation Module: This module is used to implement operations on a plane, such as down sampling and plane data copying.

Decompression Module: This module is used for decompression tasks.

NFU (Neural Functional Units): In an aspect, the NPU may be divided into three parts, NFU-1, NFU-2, and NFU-33. NFU-1 may be a multiplication unit with 256 multipliers. NFU-2 may be an addition tree, consisting of 15 adders arranged in the order of 8-4-2-1. NFU-3 may be an activation unit with 16 activation units. These components work together to process multimedia data like videos and images, and process data for neural networks The trained-machine learning model A 214 may be a neural network, such as a convolutional neural network. A Convolutional Neural Network (CNN or ConvNet) is a type of feed-forward neural network that's particularly useful for image processing tasks. CNNs are comprised of multiple layers, including an input layer, one or more hidden layers (convolutional, pooling, fully connected), and an output layer. Each neuron in a layer may be connected to the neurons of the next layer. A convolutional layer is the core building block of a CNN and where the majority of computation occurs. It uses filters (or kernels) for feature engineering and identification. The filters slide along the input features, providing responses known as feature maps. Pooling layers are used to reduce the spatial size (width and height) of the input volume. This serves to decrease the computational complexity for upcoming layers. The final layer may be a fully connected layer where each neuron is connected to every neuron in the previous layer, and its purpose is to output the final classification result.

CNNs learn to detect different features of an image using small squares of input data. While traditional neural networks are not invariant to scale and translation, CNNs handle these issues by using pooling layers. CNNs may be used in image and video recognition, recommender systems, image classification, medical image analysis, natural language processing, and more.

In an aspect, the trained-machine learning model A 214 performs image segmentation. Image segmentation is a method in which a digital image is broken into various subgroups called image segments, which help reduce the complexity of the image to make processing or analysis of the image simpler. In other words, segmentation involves assigning labels to pixels. All picture elements or pixels belonging to the same category have a common label assigned to them. Image segmentation can be a preliminary step in other machine-learning processes. For example, image segmentation can improve ML efficiency where the image is to be provided as input for object detection. Rather than processing the whole image, the detector model can be inputted with a region (e.g., showing a face) selected by a segmentation algorithm. This will prevent the detector from processing the whole image thereby reducing inference time. The output of image segmentation may be a pixel map grouping different similar regions.

In an aspect, the trained-machine learning model A 214 performs object identification. Object identification is a computer vision task that involves identifying and locating objects in images or videos. Object identification involves identifying the presence of objects in an image and locating them using a bounding box or blob. The output is one or more bounding boxes or delineated blobs, each with a class label corresponding to an object identified, such as face. Object identification combines image classification and object localization. Image classification involves predicting the class of an object in an image. Object localization refers to identifying the location of one or more objects in an image and defining their extent. Different methods of object identification are possible. For example, region-based convolutional neural networks (R-CNNs) are a family of techniques for addressing object localization and recognition tasks. You Only Look Once (YOLO) is a family of techniques for object recognition designed for speed and real-time use. Haar Cascade Classifiers are an effective method of object detection. This method uses positive and negative images to train the classifier. The output of the object identification may be one or more bounding boxes or blobs and an associated label. In one aspect, the output is a bounding box or blob encompassing a human face with a label identifying the face.

The augmentation component combines the image generated by the ISP 216 with the inference generated by the ML model A 214 to form augmented image 225. In one aspect, the augmented image 225 is formed by including the inference in a header of the image data structure (e.g., file). This may be possible where the image data structure includes headers available for including additional information. For example, a bounding box may be described with relatively little data (four pixels) and may be suitable for including in an available header. On the other hand image segments that are more specific, may require more information to accurately describe. Accordingly, some inferences may be combined with the image data structure using steganography.

The steganography component 220 may generate an augmented image using steganography to combine the inference with the image. Steganography is the practice of concealing a message within another message or a physical object. In computing, steganography often involves hiding data within a digital image or video file. Steganography allows the image data structure format to be used without alternation. That allows the inference to be included in the image without updating other components of a computing system to handle what would otherwise be an unfamiliar image format or completely separate data. For example, steganography allows the augmented image to be communicated according to the Mobile Industry Processor Interface (MIPI) Camera Serial Interface (CSI) specification, which defines an interface between a camera and a host processor.

Once communicated from the camera to the computing device, the augmented image may be separated into a base image and inference by a camera driver or other component associated with the image management. A common identifier may allow images and inferences to be associated with each other and communicated together to a ML model taking the image and inference as inputs.

In image steganography, the carrier that contains/conceals the secret information is an image. As used herein, the term "cover image" denotes the image which is used to hide the secret data as a payload or "secret message". The "embedding technique" is actually the procedure or algorithm that is used to hide the "inference" inside the "cover image" namely "stego-image" with optional "stego-key". The optional "stego-key" must be shared with both ends to allow the inference to be understood. The "stego-image" denotes the final output image that conceals the secret information and may be described as the augmented image. In other words, the stego-image is a type of augmented image. Similarly, the counterpart of embedding can extract the secret information, where "extraction technique" is the process to recover the "inference" from the "stego-image" with an optional "stego-key".

In one aspect, the least significant bits (LSB) method may be used. The process of embedding content in an image involves altering the LSB of the pixel values in a way that does not significantly change the appearance of the image. The LSBs of the pixels are changed to the binary representation of the secret message. For example, if the pixel value is 225 (binary: 11100001) and the message bit is 1, the pixel value would be changed to 224 (binary: 11100000). This change is not noticeable to the human eye, thus effectively hiding the information. To extract the hidden message, the receiver needs to know the method used to embed the information. The receiver would then read the LSBs of the pixel values and convert them back into the original message.

In another aspect, Exploiting Modification Direction (EMD) is the steganographic embedding method used. In EMD, each secret digit in a (2n+1)-ary notational system is carried by n cover pixels. Only one pixel in each group is increased or decreased by 1, or remains the same. This means there are 2n possible ways of alteration for each group of n cover pixels.

A variant of EMD, known as Advanced EMD (AEMD), may be used in an aspect. In AEMD, the secret digits in mn-ary notional systems are embedded into a group of n pixels of the cover image. To increase data hiding capacity, edge masking characteristics of the human visual system are exploited to embed more bits at image edge pixels than non-edge pixels.

Other possible steganographic methods include, Multi-Base Notation System (MBNS) based methods, Pixel Pair Matching (PPM) based methods, Gray Level Modification (GLM) based methods, histogram based methods, Pixel Value Prediction (PVP) based methods, edge based methods, mapping base methods, color model based methods, and Pixel/Block indicator base methods.

The steganographicly embedded inference may be decoded for use by various receiving applications. In one aspect, the decoding is performed by a driver (not shown) associated with the camera 103*a*. Once extracted, the inference may be mapped to the image using identification information. For example, the inference may be associated with an image identification. The inference may be optionally pushed to or retrieved by an application receiving the image.

The example receiving applications include a facial recognition system 230 with machine-learning model B 232, video conference application 234 with machine-learning model C 236, and social media application 238. The social media application 238 may communicate images to a social media service 240 that uses machine-learning model D 242 to edit images.

The facial recognition system 230 with machine-learning model B 232 may identifying a face in a picture. The facial recognition system 230 may be part of a biometric security system that unlocks a device by determining if a face depicted in an image matches a faceprint of the authorized user. The facial recognition system 230 is a technology that identifies or verifies a person by comparing and analyzing patterns based on the person's facial contours. Initially, a facial recognition system 230 maps an individual's facial features mathematically and stores the data as a faceprint. The facial recognition system 230 uses MLM B 232 to recognize facial features by extracting landmarks, or features, from an image of the user's face. An inference indicating where the face is located in the image may be extracted from the augmented image 225 and used by the MLM B 232 as an input.

The system is presented with an image extracted from augmented image 225 or video stream that shows a face. The inference indicating an image segment, face segments, or face location in the image or other information may also be provided as input. The MLM B 232 identifies specific points on the face, known as nodal points. Each human face has approximately 80 nodal points, including the distance between the eyes, the width of the nose, the depth of the eye sockets, the shape of the cheekbones, and the length of the jawline. These nodal points are measured to create a numerical code, called a faceprint, representing the face in the database. The faceprint is then used to search for other images in the database with matching codes.

The video conference application 234 with machine-learning model C 236 may enable video conferencing. Video conferencing is a technology that allows two or more people to communicate in real-time using video and audio. It uses the Internet to facilitate live, face-to-face interactions and collaboration through audio, video, screen sharing, and chat. Video and audio are captured through devices like camera 103*a*. The machine-learning model C 236 may perform various functions, such as background blurring or swapping, teeth whitening, and or other enhancements. The machine-learning model C 236 may make these enhancements using the inference provided in the augmented image 225 as an input. The enhanced images are compressed to make it easier to transmit over the internet. The compressed data is sent over the internet to the receiving end. The received data is decompressed and converted back into video and audio. It is then displayed on the user's screen and played through their speakers or headphones.

The social media application 238 may allow a user to view and post images, videos, or other content. The social media application 238 may communicate images, videos, or other content to a social media service 240 that uses machine-learning model D 242 to edit images. The social media application 238 provides the interface that users interact with. The social media application 238 may be a software application installed on a user device, such as a smartphone or a computer. When a user wants to view or post images, they open the application and navigate to the appropriate section. The application displays images stored in the social media service's databases, and provides options for the user to select and upload new images. The application also handles user authentication, ensuring that users can only access their own accounts.

The social media service 240 is the backend that powers the social media application 238. It consists of servers and databases that store and manage social media data, including images, user profiles, and posts. When a user views an image, the application sends a request to the service, which retrieves the image data from the database and sends it back to the application to be displayed. When a user posts an image, the application sends the image data to the social media service 240, which stores it in the database and updates any relevant information, such as adding the image to the user's list of posts.

The interaction between the social media application 238 and social media service 240 is facilitated by an Application Programming Interface (API). The API defines a set of rules for how the social media application 238 and social media service 240 communicate. For example, the API specifies how the application should format a request for an image, and how the service should format the image data in its response By adhering to the API, the social media application 238 and social media service 240 can work together seamlessly to provide a smooth user experience. The combination of the social media application 238 and social media service 240 allows users to view and post images to the social media platform. In one aspect, the social media service 240 API may be modified to receive an augmented image, if necessary. In one aspects, the social media service 240 API may be modified to recognize and differentiate between a regular image and an augmented image.

In the example shown, the social media service 240 uses a machine-learning model D 242 to edit images. The machine-learning model D 242 may generate any of several different edits to one or more faces in the image. A preliminary step in these face editing operations is identifying a portion of the image depicting a face. Instead of performing this step, the machine-learning model D 242 may use the identification of the area depicting a face from the augmented image. Example face edits include skin smoothing, skin brightening, teeth whitening, eye enlargement, face slimming, facial feature reshaping, and color correction. Skin smoothing filters can smooth out skin, reducing the appearance of blemishes, wrinkles, and other imperfections. Skin brightening filters can brighten skin, enhancing details that might have been lost in shadows. Teeth whitening filters can make teeth appear whiter. Eye enlargement filters can make eyes look bigger. Face slimming filters, like the "skinny filter" on TikTok, can make faces look slimmer. Facial feature reshaping filters can reshape jaws or noses, and make lips look fuller. These filters use machine learning models to alter facial features in photos. The augmented image may be an input to the machine-learning model D 242.

Figure 3:
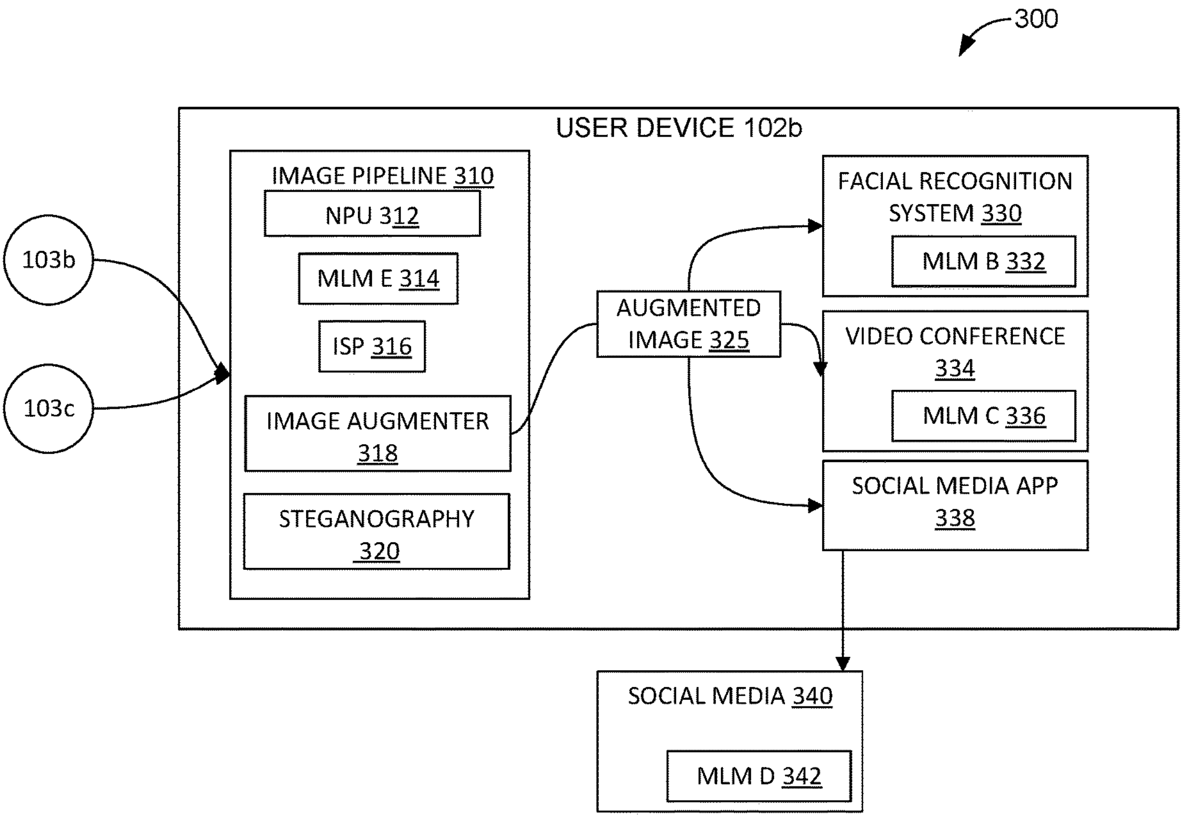
FIG. 3 is a block diagram of an example operating environment for generating an augmented image, in accordance with an aspect of the technology described herein.

Referring now to FIG. 3, a block diagram is provided showing aspects of an example computing system architecture suitable for implementing some embodiments of the disclosure and designated generally as system 300. FIG. 3 illustrates a Bayer color sensor camera 103*b*, an infrared camera 103*c*, and user device 102*b*. FIG. 3 illustrates that the technology may work with camera systems that use multiple cameras, including cameras of different types. The different types of cameras may be described as heterogeneous. For example, heterogeneous cameras could be any of a wide-angle camera, an ultra-wide-angle camera, a telephoto camera, macro camera, monochrome camera, depth sensor or 3D time-of-flight (ToF) sensor, a front camera (a type of wide-angle camera), a color camera, and an infrared camera. FIG. 3 shows a color camera and an IR camera, but other combinations of heterogeneous cameras are possible. The user device 102*b* includes an image pipeline 310 and several applications that use images and/or augmented images 325 output by the image pipeline 310. The image pipeline 310 includes a neural processing unit 312 with a trained machine-learning model E 314. The image pipeline 310 also includes an image signal processor (ISP) 316. The image pipeline 310 also includes an image augmenter 318 and steganography component 320.

The image signal processor (ISP) 316, also known as an image processing engine, image processing unit (IPU), or image processor, is a type of media processor or specialized digital signal processor (DSP) used for image processing. The ISP takes the raw sensor data generated by a light sensor in a camera and converts the raw sensor data into image data. In this example, the ISP 316 may generate an infrared image and a color image. Both images may be communicated to the neural processing unit 312 (NPU).

The neural processing unit 312 (NPU) is a specialized processor designed for accelerating neural network operations and ML tasks. In an aspect, the trained-machine learning model E 314 performs image segmentation. Image segmentation is a method in which a digital image is broken into various subgroups called image segments, which help reduce the complexity of the image to make processing or analysis of the image simpler. In an aspect, the trained-machine learning model E 314 performs object identification. Object identification is a computer vision task that involves identifying and locating objects in images or videos. Object identification involves identifying the presence of objects in an image and locating them using a bounding box or blob. The output is one or more bounding boxes or delineated blobs, each with a class label corresponding to an object identified, such as face. In one aspect, the output is a bounding box encompassing a human face with a label identifying the box and encompassing a face.

In FIG. 3, the ML model E 314 may use the color image and/or infrared image as input to make the inference. In certain light conditions, the segmentation or object identification may be less accurate. At the very beginning of the ML inference process, only IR image is processed for face detection (or other inference) by ML model E 314. After face(s) coordinate(s) information is identified over the IR image. Then the ISP 316 utilizes the coordinates to apply IR camera intrinsic parameters to de-project the face coordinates into world coordinates with respect to the IR camera. The intrinsics parameters of the color camera may then be used to project from the world coordinates onto the color image. After the system described herein went through this conversion process, face detection blob information on the color image could be retrieved via IR image.

In the context of computer vision and 3D geometry, different coordinate systems may be defined. Two of the most common ones are the world coordinates and the camera (or extrinsic) coordinates. World coordinates is a fixed coordinate system used for representing objects (points, lines, surfaces, etc.) in the world. It's often chosen based on convenience for the problem at hand. For example, in a room, the origin of the world coordinates could be one corner of the room, with the axes aligned along the walls, floor, and ceiling. Camera (Extrinsic) Coordinates is a coordinate system that uses the camera center as its origin, and the optic axis (the direction the camera is pointing) as the Z-axis. The X and Y axes are defined in a way that forms a right-handed coordinate system with the Z-axis. The transformation from world coordinates to camera coordinates is done using the extrinsic matrix, which consists of a rotation and translation. This matrix describes the pose (position and orientation) of the camera in the world. These two coordinate systems and their transformation help relate a 3D point in the real world to a 2D point in the image captured by the camera.

The process described above is especially useful when the camera system is operated under extreme ambient light environment, which may be either too dark or too bright, that the image(s) captured by the color camera do not contain sufficient information for identifying face blob (or object or segmentation) within its field of view. In contrast, the IR camera module senses the light in different spectrums. As a result, under a dim light condition, the IR camera module might have a significantly better chance to locate human faces within the field of view.

The image augmenter 318 combines the image generated by the ISP 316 with the inference generated by the ML model E 314 to form augmented image 325. The augmented image may be the color image with an inference made using both the color image and the IR image. Though not shown, the IR image may be communicated separately. The color image, inference, and IR image may be associated together based on a time indicator or other common identifying information. In another aspect, the augmented image 325 includes the IR image with the inference and the color image is communicated separately.

In one aspect, the augmented image 325 is formed by including the inference in a header of the image data structure (e.g., file). This may be possible where the image data structure includes headers available for including additional information. For example, a bounding box may be described with relatively little data (four pixels) and may be suitable for including in an available header. On the other hand image segments that are more specific, may require more information to accurately describe. Accordingly, some inferences may be combined with the image data structure using steganography.

The steganography component 320 may generate an augmented image using steganography to combine the inference with the image. Steganography is the practice of concealing a message within another message or a physical object. In computing, steganography often involves hiding data within a digital image or video file. Steganography allows the image data structure format to be used without alternation. That allows the inference to be included in the image without updating other components of a computing system to handle what would otherwise be an unfamiliar image format or completely separate data. For example, steganography allows the augmented image to be communicated according to the Mobile Industry Processor Interface (MIPI) Camera Serial Interface (CSI) specification, which defines an interface between a camera and a host processor.

Once communicated from the camera to the computing device, the augmented image may be separated into a base image and inference by a camera driver or other component associated with the image management. A common identifier may allow images and inferences to be associated with each other and communicated together to a ML model taking the image and inference as inputs.

The example receiving applications include a facial recognition system 330 with machine-learning model B 332, video conference application 334 with machine-learning model C 336, and social media application 338. The social media application 338 may communicate images to a social media service 340 that uses machine-learning model D 342 to edit images. The receiving applications may be similar to those described previously with reference to FIG. 2. Each receiving application may receive a color image and/or IR image, and ISP inference as input. The receiving application uses this input, including the ISP inference, as input to make a further inference with a ML model. The receiving application may then take an action based on the further inference.

Figure 4:
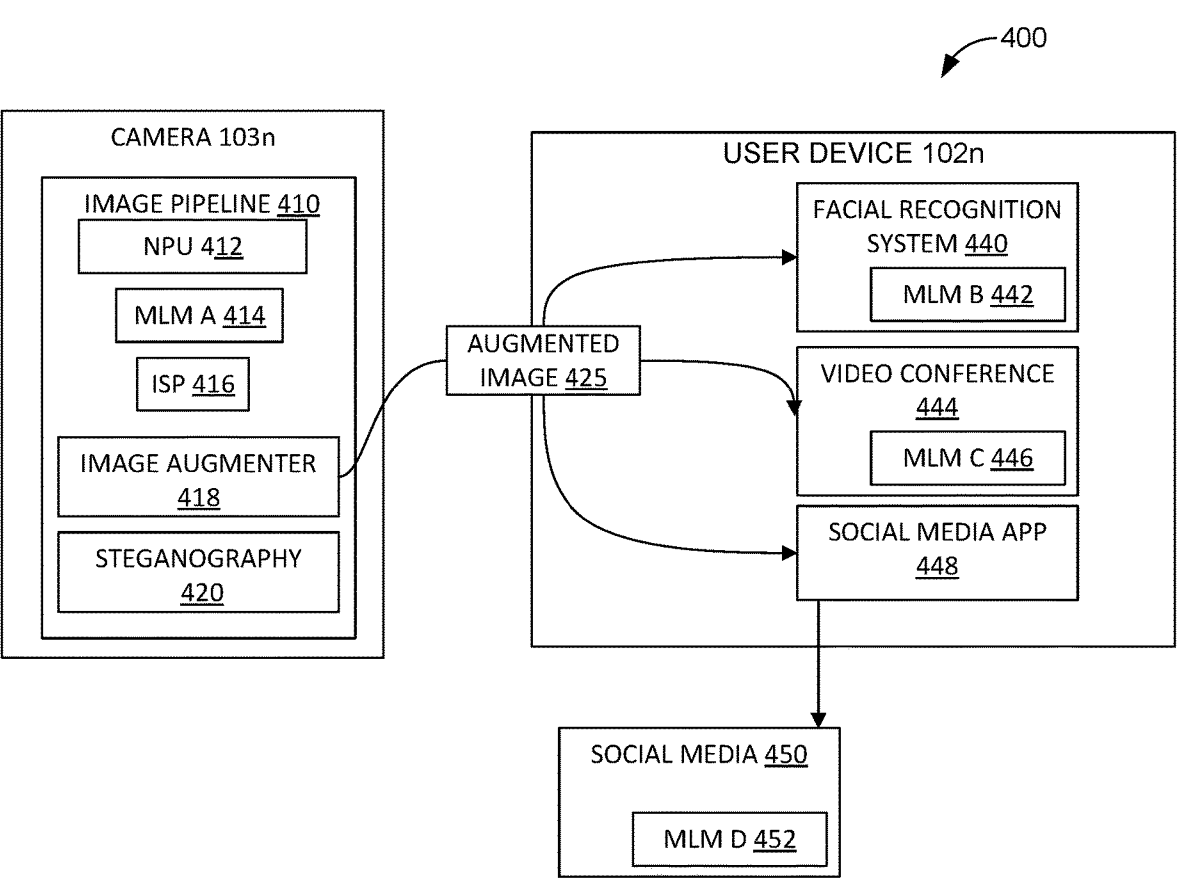
FIG. 4 is a block diagram of an example operating environment for generating an augmented image, in accordance with an aspect of the technology described herein.

Referring now to FIG. 4, a block diagram is provided showing aspects of an example computing system architecture suitable for implementing some embodiments of the disclosure and designated generally as system 400. FIG. In FIG. 4, the camera is remote from the user device that uses the ML inference from the ISP. FIG. 4 illustrates a camera **103*n* and user device 102*n*. The camera 103*n* includes an image pipeline 410. The user device 102*n* includes several applications that use images and/or augmented images 425 output by the image pipeline 410. The image pipeline 410 includes a neural processing unit 412 with a trained machine-learning model A 414. The image pipeline 410 also includes an image signal processor (ISP) 416. The image pipeline 410 also includes an image augmenter 418 and steganography component 420**.

FIG. 4 is similar to FIG. 2, except that the camera **103*n* is separate from the user device 102*n*. For example, the camera 103*n* may be an independent web camera connected to the user device 102*n* through a USB connection or other mechanism. It should also be noted that the implementation shown in FIG. 3, with two heterogeneous cameras (e.g., color and IR), may also be implemented over a USB connection or other remote connection, such as Wi-Fi, as shown in FIG. 4. The remote implementation shown in FIG. 4 may include multiple cameras, though only one is shown for the sake of simplicity. In a multiple camera implementation, the image pipeline 410** may be used to generate an image from multiple cameras and a ML inference using one or more of the images.

The example receiving applications include a facial recognition system 440 with machine-learning model B 442, video conference application 444 with machine-learning model C 446, and social media application 448. The social media application 448 may communicate images to a social media service 450 that uses machine-learning model D 452 to edit images. The receiving applications may be similar to those described previously with reference to FIG. 2. Each receiving application may receive a color image and ISP inference as input. The receiving application uses this input, including the ISP inference, as input to make a further inference with a ML model. The receiving application may then take an action based on the further inference.

Example Methods

Now referring to FIGS. 5 and 6, each block of methods 500 and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by an operating system. In addition, methods 500 and 600 are described, by way of example, with respect to FIGS. 1-4. However, these methods may additionally or alternatively be executed by any one system, or any combination of systems, including, but not limited to, those described herein.

FIG. 5 is a flow diagram showing a method 500 of generating an augmented image, in accordance with some embodiments of the present disclosure. Method 500 may be performed on or with systems similar to those described with reference to FIGS. 1-4.

At step 510, method 500 includes receiving at an image signal processor (ISP) raw sensor data from a sensor that is associated with a camera. The ISP is a type of media processor or specialized digital signal processor used for image processing. The ISP takes the raw sensor data generated by a light sensor in a camera and converts the raw sensor data into image data. The ISP can work with different types of sensors, such as the Complementary Metal-Oxide-Semiconductor (CMOS) or charge-coupled device (CCD) sensor. The final result (e.g., raw signal) of the CMOS image sensor is digital voltage values that represent the red, green, and blue light intensity seen by each pixel in the pixel matrix of the sensor. These digital voltage values are sent to the ISP and are further processed to generate an image that can be stored and/or displayed. At step 520, method 500 includes generating an image at the ISP using the raw sensor data. At step 530, method 500 includes communicating the image from the ISP to a neural processing unit (NPU), wherein the NPU includes a machine-learning (ML) model trained to make an inference about an input image.

At step 540, method 500 includes generating, at the NPU using the ML model, a ML inference about the image. The ML model may be a neural network, such as a convolutional neural network. In an aspect, the ML model performs image segmentation. Image segmentation is a method in which a digital image is broken into various subgroups called image segments, which help reduce the complexity of the image to make processing or analysis of the image simpler. In other words, segmentation involves assigning labels to pixels. In an aspect, the ML model performs object identification. Object identification is a computer vision task that involves identifying and locating objects in images or videos. Object identification involves identifying the presence of objects in an image and locating them using a bounding box or blob. In one aspect, the output is a bounding box or blob encompassing a human face with a label identifying the face. The human face is the object identified.

At step 550, method 500 includes associating the ML inference with the image to form an augmented image. In aspects, the ML inference may be associated with the image using steganography. At step 560, method 500 includes communicating the augmented image from the ISP to a computing component. The computing component could be a camera driver, operating system component, or the like. The computing component may make the image available to other consumers of the image and/or the ML inference.

FIG. 6 is a flow diagram showing a method 600 of generating an augmented image, in accordance with some embodiments of the present disclosure. Method 600 may be performed on or with systems similar to those described with reference to FIGS. 1-4. At step 610, method 600 includes receiving, at an image signal processor (ISP), raw color sensor data from a color sensor that is associated with a first type of camera. At step 620, method 600 includes receiving, at the image signal processor (ISP), raw second sensor data from a second sensor that is associated with a second type of camera, wherein the first type of camera and second type of camera are different. In aspects the second type of camera is an IR camera. In another aspect, the second type of camera is a black and white camera. A camera is of a different type if it has a different photographic characteristic. At step 630, method 600 includes generating a color image at the ISP using the raw color sensor data. At step 640, method 600 includes generating a second image at the ISP using the second sensor data.

At step 650, method 600 includes communicating the color image and the second image from the ISP to a neural processing unit (NPU), wherein the NPU includes a machine-learning (ML) model trained to make an inference about an input image. At step 660, method 600 includes generating, using the second image as input, at the NPU using the ML model, a ML inference about the color image. In certain light conditions, the segmentation or object identification may be less accurate. As mentioned, the second image may be an IR image. In an aspect, at the very beginning of the ML inference process, only the IR image is processed for face detection (or other inference) by ML model E 314. After face(s) coordinate(s) information is identified over the IR image, the coordinates will be applied to IR camera intrinsic parameters to de-project the face coordinates into world coordinates with respect to the IR camera. The extrinsic parameters of the color camera may then be used to project from the world coordinates onto the color image. After the system described herein went through this conversion process, face detection blob information on the color image could be retrieved via IR image.

The process described above is especially useful when the camera system is operated under extreme ambient light environment, which may be either too dark or too bright, that the image(s) captured by the color camera do not contain sufficient information for identifying face blob (or object or segmentation) within its field of view. In contrast, the IR camera module senses the light in different spectrums. As a result, under a dim light condition, the IR camera module might have a significantly better chance to locate human faces within the field of view. At step 670, method 600 includes communicating the ML inference from the ISP to a computing component. The computing component could be a camera driver, operating system component, or the like. The computing component may make the image available to other consumers of the image and/or the ML inference. The ML inference may be communicated in an augmented image, as described previously.

Example Operating Environment

Figure 7:
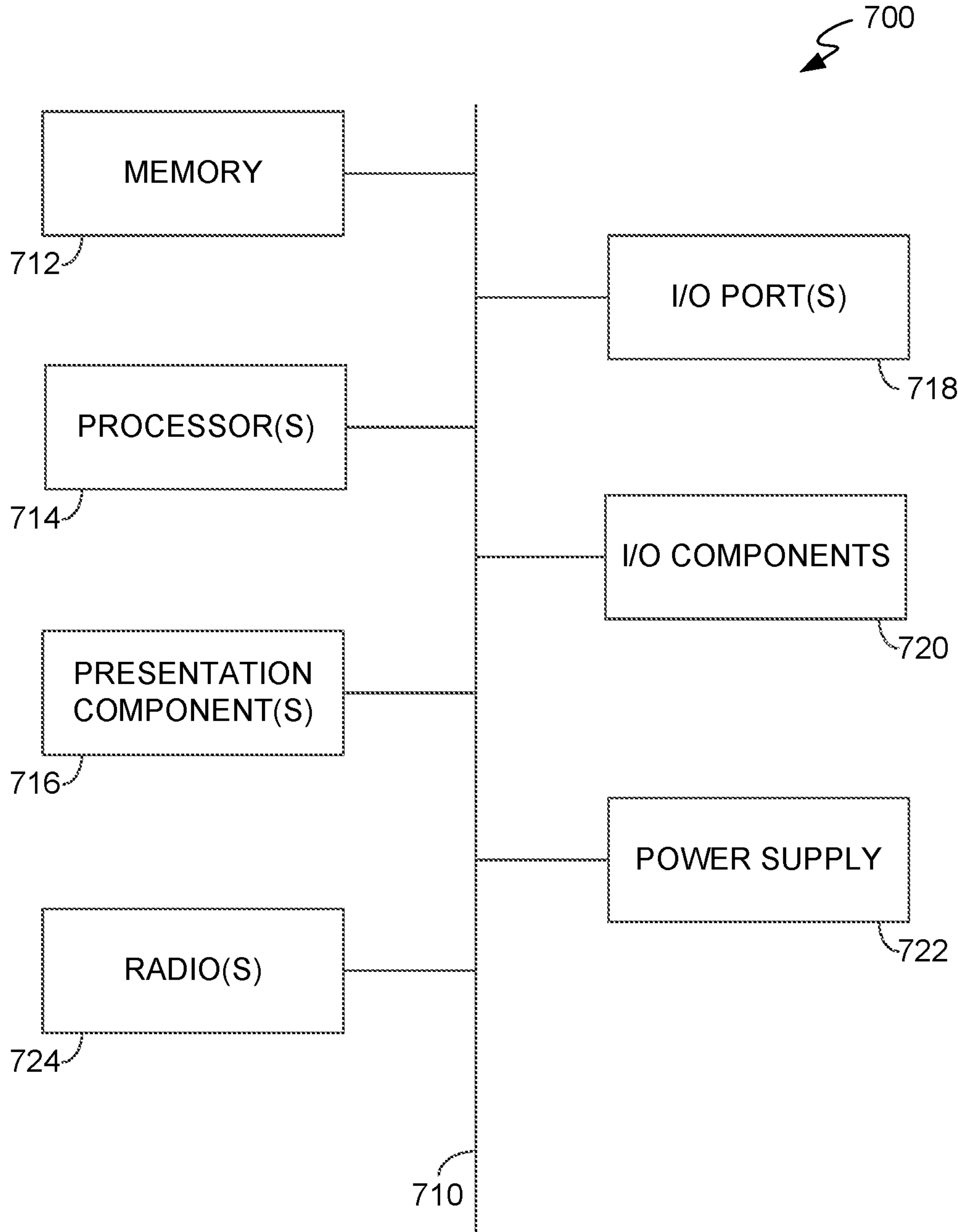
FIG. 7 is a block diagram showing a computing device suitable for implementations of the technology described herein.

Referring to the drawings in general, and initially to FIG. 7 in particular, an example operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of a computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Example memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Example presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

EMBODIMENTS

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device performs a method of generating an augmented image, the method comprising:

receiving at an image signal processor (ISP) raw sensor data from a sensor that is associated with a camera;

generating an image at the ISP using the raw sensor data;

communicating the image from the ISP to a neural processing unit (NPU), wherein the NPU includes a machine-learning (ML) model trained to make an inference about an input image;

generating, at the NPU using the ML model, a ML inference about the image;

associating the ML inference with the image to form an augmented image by embedding the ML inference within the image using image steganography such that the ML inference is hidden in pixel data of the image; and communicating the augmented image from the ISP to a computing component.

2. The media of claim 1, wherein the ML inference indicates a region of the image depicting a face.

3. The media of claim 1, wherein the ML inference is a segment identification.

4. The media of claim 1, wherein the augmented image remains compliant with a standard camera image interface.

5. The media of claim 1, wherein the method further comprises extracting the ML inference from the augmented image to generate a separate image and the ML inference.

6. The media of claim 1, wherein the method further comprises communicating the ML inference to a receiving application that uses the ML inference as input to a separate ML process.

7. The media of claim 1, wherein the augmented image is communicated over a bus conforming to a Mobile Industry Processor Interface (MIPI) Alliance standard or a USB connection.

8. A method of generating an augmented image comprising:

receiving, at an image signal processor (ISP), raw color sensor data from a color sensor that is associated with a first type of camera;

receiving, at the image signal processor (ISP), raw second sensor data from a second sensor that is associated with a second type of camera, wherein the first type of camera and second type of camera are different;

generating a color image at the ISP using the raw color sensor data;

generating a second image at the ISP using the second sensor data;

communicating the color image and the second image from the ISP to a neural processing unit (NPU), wherein the NPU includes a machine-learning (ML) model trained to make an inference about an input image;

receiving a ML inference about the color image from the NPU, wherein the NPU generated the ML inference using the second image as input; and communicating the ML inference from the ISP to a computing component.

9. The method of claim 8, wherein the ML inference indicates image segmentation.

10. The method of claim 8, wherein the ML inference indicates a region of the color image depicting a face.

11. The method of claim 8, further comprising associating the ML inference with the color image to form an augmented image.

12. The method of claim 11, wherein the ML inference is associated with the color image using steganography.

13. The method of claim 8, further comprising associating the ML inference with the second image to form an augmented image.

14. The method of claim 8, wherein the second type of camera is an infrared camera.

15. The method of claim 11, wherein the method further comprises extracting the ML inference from the augmented image to generate a separate image and the ML inference.

16. The method of claim 8, wherein the method further comprises communicating the ML inference to a receiving application that uses the ML inference as input to a separate ML process.

17. A camera system comprising:

a color image sensor;

an image signal processor (ISP) communicatively coupled to the color image sensor;

a neural processing unit (NPU) communicatively coupled to the ISP, wherein the NPU includes a machine-learning (ML) model trained to make an ML inference about a color image generated by the ISP;

a steganography component programed to associate the ML inference with the color image using steganography to generate an augmented image;

and an output port configured to output the augmented image comprising the color image and the ML inference.

18. The system of claim 17, further comprising an infrared image sensor communicatively coupled to the ISP.

19. The system of claim 18, wherein the ML model is further trained to make the inference using an infrared image generated by the infrared image sensor.

20. The system of claim 17, wherein the camera system is physically integrated with a computing device.

* * * * *